(12) United States Patent
Scheibel

(10) Patent No.: US 6,273,528 B1
(45) Date of Patent: Aug. 14, 2001

(54) BRAKE FORCE CONTROL VALVE

(75) Inventor: Joerg L. Scheibel, Oakland, MI (US)

(73) Assignee: Continental Teves, Inc., Auburn Hills, MI (US)

( * ) Notice: Subject to any disclaimer, the term of this patent is extended or adjusted under 35 U.S.C. 154(b) by 0 days.

(21) Appl. No.: 09/376,841

(22) Filed: Aug. 18, 1999

(51) Int. Cl.[7] .................................. B60T 8/42; B60T 8/00
(52) U.S. Cl. ...................... 303/117.1; 303/61; 303/119.2; 303/115.2; 303/900; 303/901
(58) Field of Search ........................ 303/117.1, 119.2, 303/900, 901, 115.1–115.2, 116.1–116.4, 113.2, 15, 61, 10, 113.1; 137/627.5, 596.16, 596.17; 251/129.15, 129.01, 129.08, 129.06

(56) References Cited

U.S. PATENT DOCUMENTS

| | | | |
|---|---|---|---|
| 4,395,072 | * | 7/1983 | Belart ............................ 303/116.1 |
| 4,957,331 | * | 9/1990 | Burton et al. ................. 303/115.1 |
| 5,042,885 | * | 8/1991 | Villec ............................. 303/115.1 |
| 5,147,116 | * | 9/1992 | Parker et al. ................. 303/115.2 |
| 5,465,817 | | 11/1995 | Muscatell . |
| 5,472,268 | | 12/1995 | Ando et al. . |
| 5,529,389 | | 6/1996 | Sekiguchi . |
| 5,540,488 | | 7/1996 | Terazawa et al. . |
| 5,618,086 | | 4/1997 | Reuter . |

* cited by examiner

Primary Examiner—Douglas C. Butler
(74) Attorney, Agent, or Firm—Brinks Hofer Gilson & Lione

(57) ABSTRACT

A brake force control valve for use with an electrically controlled braking system having a housing with first and second fluid channels, a coil coupled to the housing, a ferrous core magnetically interacting with the coil, a spool coupled to the ferrous core, where the spool in conjunction with the housing forms a compression volume, a plurality of seals to fluidly seal the compression volume and where the coil is energized and deenergized to move the spool back and forth, the spool varying the volume of the compression volume to create positive pressure, thereby creating a pumping action.

18 Claims, 2 Drawing Sheets

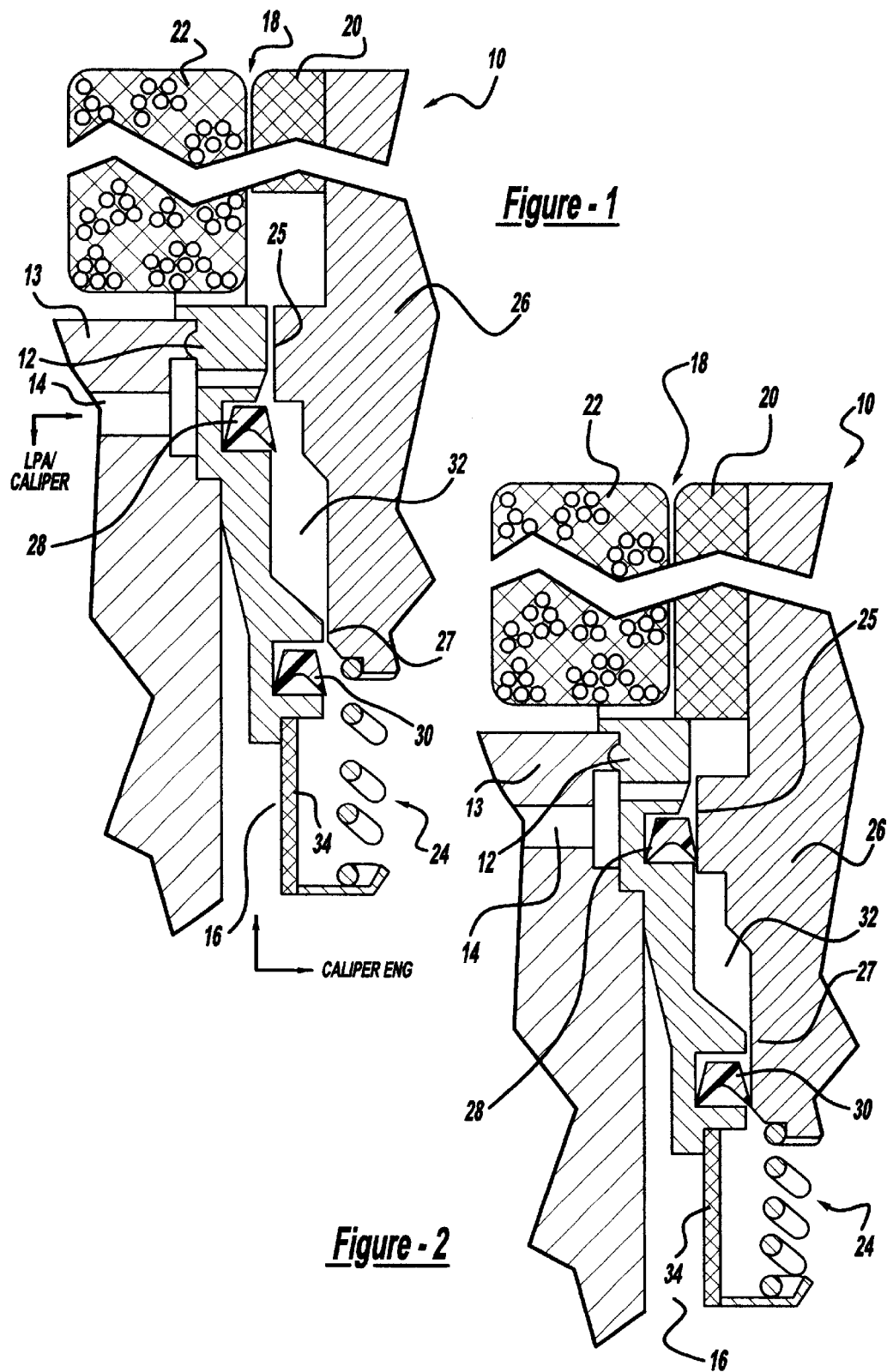

BRAKE FORCE CONTROL VALVE

BACKGROUND OF THE INVENTION

The present invention relates to a component for a hydraulic braking system in an automotive vehicle and more particularly, to an electrically actuated valve device which can also provide a pump function.

Modern motor vehicles are increasingly equipped with anti-lock braking systems (ABS) and other similar braking torque control systems. ABS automatically relieve applied brake force to wheels experiencing a lock-up condition during braking, associated with skidding and loss of directional control. In addition to braking torque control, the components used in ABS are now being employed for other advantageous vehicle functions. For example, traction control systems (TCS) can apply braking torque to a spinning wheel to enable increased driving torque to be transferred to the opposite wheel through the vehicle's differential. TCS therefore involves applying braking torque while the operator is not depressing the brake pedal. In addition, automobile stability management systems (ASMS) apply braking torque to selected wheels while the vehicle is undergoing a turning maneuver to provide enhanced directional control in skidding conditions.

In the case of all the above described systems, which can be broadly described as electronic braking control systems, an active source of hydraulic fluid pressure, that is a pump, and a control valve system is used. The control valves, which modulate the application of fluid pressure to the wheel cylinder, are typically of the spool valve (or shuttle valve) variety. Depending on the vehicle application, the spools can be moved between positions by applied fluid pressure, or moved under the influence of external mechanical forces such as applied by an electrical solenoid.

Present spool type brake force valves act to control pressure by covering and uncovering ports through which fluid flows. Thus, they can be modeled as a single valve or a series of valves which are controlled simultaneously. The control functions are thus provided by creating various levels of restriction to the flow of brake fluid. These valves are not ordinarily capable of increasing fluid pressure or providing a pumping function of their own.

In certain designs of electronic braking control systems, there is a need to provide a brake force valve which further provides a pumping function. Even a pumping function of limited output capacity may aid in providing increased system transient response, enabling more rapid response by downstream connected devices, and providing a pressure spike where pressure from the system's pump is still building.

The present invention provides a brake force valve which provides a pumping function, to address the needs mentioned previously.

SUMMARY OF THE INVENTION

In accordance with the present invention, a brake force control valve with pump and valve function capabilities is provided. In the preferred embodiment, the control valve includes a solenoid coupled to the valve spool for actuation of the spool. The spool is coupled to a return spring to return the spool to its deactuated position on the removal of current to the solenoid. Cup seals having a substantially V-shaped profile are utilized in conjunction with the spool to permit unidirectional fluid flow past the spool. The stroking of the spool via the solenoid will create an open valve or closed valve condition, depending on the position of the spool relative to the cup seals and flow ports. The cup seals are also utilized to create a seal for a compression area formed by the spool and housing of the brake force control valve. Energization of the solenoid will change the volume of the compression area and create a pumping action to provide a positive pressure source for a braking system while simultaneously providing fluid flow control.

BRIEF DESCRIPTION OF THE DRAWINGS

The various advantages of the present invention will become apparent to those skilled in the art after reading the following specification and by reference to the drawings, in which:

FIG. 1 shows a cross sectional view of the brake force control valve of the present invention with the spool positioned in an open valve position;

FIG. 2 shows a cross sectional view of the brake force control valve of the present invention with the spool positioned in a closed valve position.

DETAILED DESCRIPTION OF THE PRESENT INVENTION

Figure 3:
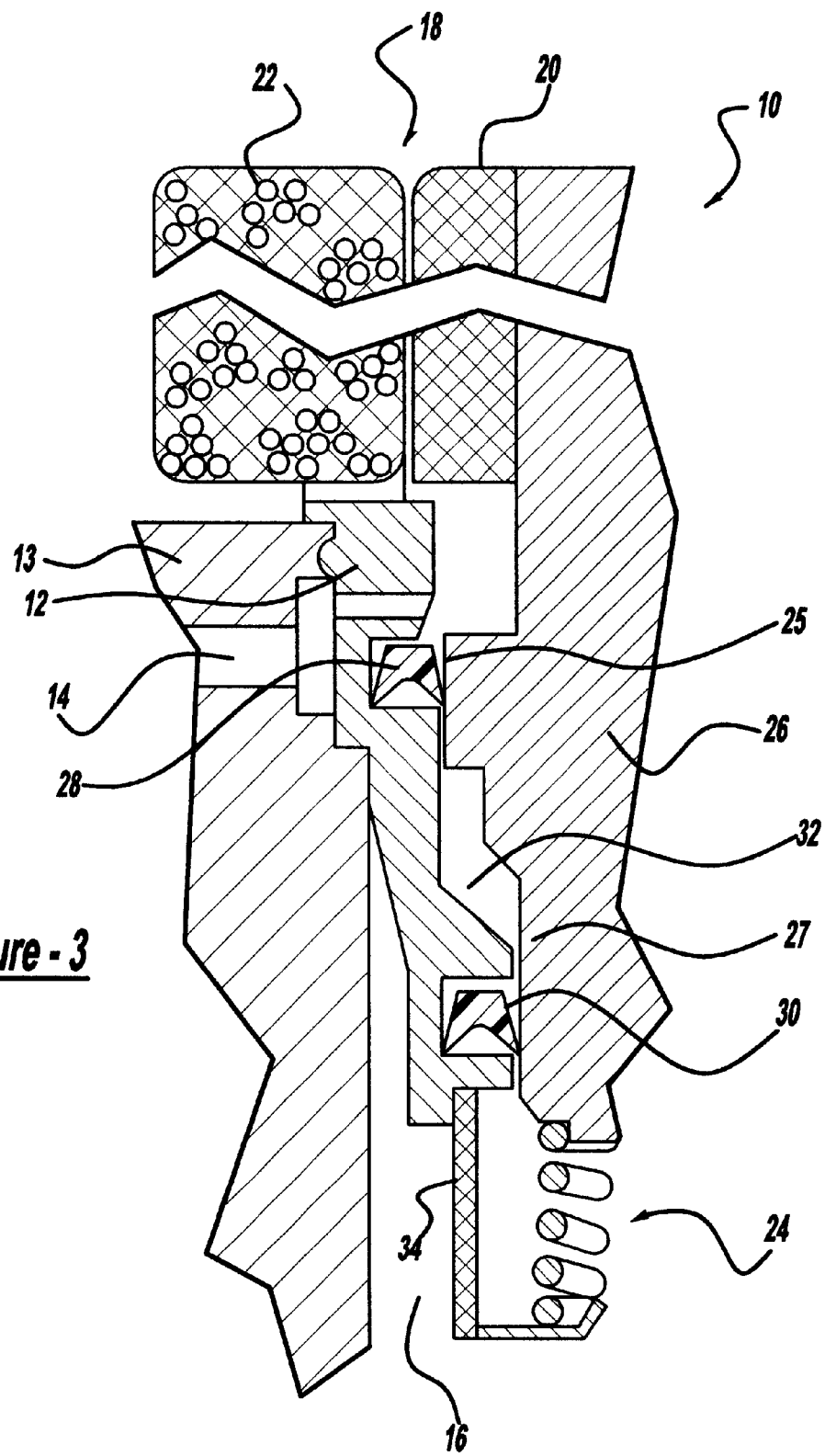
FIG. 3 shows a cross sectional view of the brake force control valve of the present invention with the spool positioned midstroke in a pumping action.

Referring to FIG. 1, the brake force control valve 10 of the present invention is shown in a cut-away cross sectional view. A housing 12, received by part 13, provides the major physical structure for the brake force control valve 10 and also provides for brake fluid flow connections or channels 14 and 16 to remote braking system components. A solenoid 18 having a core 20 of ferrous material and a coil 22 is the variable force actuation device of the present invention, however any other type of actuation device may be employed such as cams, levers, electric motors, fluid cylinders, etc. The coil 22 is coupled to the housing 12 and is energized and deenergized in response to an external current signal to magnetically interact with the core 20. The core 20 and a spring 24 are coupled on opposite ends of a spool 26 located in the housing 12. The spool 26 is configured to closely conform to the housing 12 at surfaces 25 and 27 to form discrete volumes between the spool 26 and housing 12. Variable forces are applied to the spool 26 through the energization of the coil 22. The position of spool 26 within its bore in the housing 12 is determined by the net forces acting on it exerted by solenoid 18, return spring 24, and fluid forces acting upon it.

The movement of the spool 26 in the brake force control valve 10 of the present invention in combination with cup seals 28 and 30 allows the brake force control valve 10 to provide a valve function. Flow channel 14 terminates above cup seal 28 and flow channel 16 terminates below cup seal 30 (with reference to the orientation shown in the FIGS.). The position of the flow channels 14 and 16 relative to the cup seals 28 and 30, and spool 26 allows the fluid flow to be controlled through the brake force control valve 10. As seen in FIG. 1, the solenoid 18 in a deenergized state, allows spring 24 to position the spool 26 such that bidirectional fluid flow is allowed from channel 14 via channel 16 through a compression area 32 and a filter 34. The brake force control valve 10 in this state, constitutes an open valve.

As seen in FIG. 2, the solenoid 18 in an energized state compresses the spring 24 to stroke the spool 26 downwardly and block the flow of fluid from channel 16 to channel 14.

Only unidirectional fluid flow from the channel 14 via the compression area 32 and filter 34 to channel 16 is allowed because of the configuration of cup seals 28 and 30. The cup seals 28 and 30 have substantially V-shaped profiles with one leg of the V forming a sleeve sealing the housing 12 and the other leg of each seal forming a lip touching, with its outer edge, the surfaces 25 and 27 of the spool 26. If pressure is applied from the closed end of the V profile (i.e. downwardly through the valve as shown), the lip of each cup seal 28 and 30 is urged away from the surfaces 25 and 27 of the spool 26 and gives way for the brake fluid to pass the cup seals 28 and 30. If the pressure is applied from the open side of the V-profile, the lip is pressure actuated to press against the spool 26, thereby preventing any flow of the pressure medium past the cup seals 28 and 30. Thus the brake force control valve 10 may function as a closed valve with reference to fluid flow from channel 16 to channel 14.

The pumping action is provided by the motion of the spool 26 from its position seen in FIG. 2 to its position seen in FIG. 3. The stroke of the spool 26 captures fluid by isolating the compression area 32 via the cup seals 28 and 30 and then reduces the volume of the compression area 32, forcing fluid past cup seal 30 through the filter 34 and fluid channel 16. Pumping occurs since spool 26 defines two different diameters where the seals engage the spool at surface 25 and 27. Thus the volume of compression area 32 reduces as the spool 26 strokes downwardly. Moving back to the position shown in FIG. 2, the spool 26 fills the compression area 32 via fluid traveling through channel 14 and the pumping action may be repeated. The pumping action provides positive pressure to brake components connected to fluid channel 16.

It is to be understood that the invention is not limited to the exact construction illustrated and described above, but that various changes and modifications may be made without departing from the spirit and scope of the inventions as defined in the following claims.

What is claimed is:

1. A brake force control valve for use with a vehicle brake system comprising:
   a housing having first and second fluid channels;
   an actuator coupled to said housing for exerting a controlled variable force, said actuator having a coil coupled to said housing, and a ferrous core magnetically interacting with said coil,
   a spool coupled to said actuator, wherein said spool interacts with said housing to form a compression volume having a variable volume as said spool moves within said housing;
   at least two seals acting between said housing and said spool to fluidly seal said compression volume; and
   wherein as said actuator moves said spool between positions within said housing, said spool varying the volume of said compression volume to create positive pressure, thereby creating a pumping action.

2. The brake force control valve of claim 1, further including a spring acting between said spool and said housing to urge said spool to a first position, wherein said coil is energized to move said spool from said first position against said spring to move said spool to a second position.

3. The brake force control valve of claim 1, wherein said spool at said first position causes the brake force control valve to function as an open valve and wherein said spool at said second position causes the brake force control valve to function as a closed valve and said spool is further movable to a third position wherein said compression volume is larger in said second position than in said third position whereby said spool interacts with said seals to provide said pumping action.

4. The brake force control valve of claim 1, wherein said plurality of seals are cup seals having a V-shaped profile.

5. The brake force control valve of claim 1, wherein said plurality of seals allow only unidirectional fluid flow.

6. The brake force control valve of claim 1, wherein said fluid channels provide connections to external brake components.

7. The brake force control valve of claim 1, further comprising a filter coupled to at least one said fluid channel.

8. A brake force control valve for use with a vehicle brake system to control the flow of brake fluid comprising:
   a housing having first and second fluid channels;
   a coil coupled to said housing;
   a ferrous core magnetically interacting with said coil;
   a spool coupled to said ferrous core, wherein said spool interacts with said housing to form a compression volume having a variable volume as said spool moves within said housing, said spool defining at least first and second diameter sections, wherein said first diameter is greater than said second diameter;
   at least two seals acting between said housing and said spool to fluidly seal said compression volume and engaging said first and second diameters, said seals having a generally "V" shaped cross-sectional shape to provide a relatively high restriction to fluid flow in a first direction, and a relatively lower fluid flow restriction in a second direction; and
   wherein said coil is energized and deenergized to move said spool between positions within said housing, said spool varying the volume of said compression volume to create positive pressure, and wherein said seals being oriented to cause said first seal to provide said relatively high restriction and said second seal provides said relatively lower restriction whereby said brake fluid flows past said second seal to said second fluid channel.

9. The brake force control valve of claim 8 further including a spring acting between said spool and said housing to urge said spool to a first position, wherein said coil is energized to move said spool from said first position against said spring to move said spool to a second position.

10. The brake force control valve of claim 9, wherein said spool at said first position causes the brake force control valve to function as an open valve and wherein said spool at said second position causes the brake force control valve to function as a closed valve.

11. The brake force control valve of claim 8, wherein said fluid channels provide connections to external brake components.

12. The brake force control valve of claim 8 further comprising a filter coupled to at least one said fluid channel.

13. A brake force control valve for use with a vehicle brake system comprising:
   a housing having first and second fluid channels;
   an actuator coupled to said housing for exerting a controlled variable force;
   a spool coupled to said actuator, wherein said spool interacts with said housing to form a compression volume having a variable volume as said spool moves within said housing;
   at least two seals associated with and contacting said spool and having a V-shaped profile acting between said housing and said spool to fluidly seal said compression volume and whereby said seals allowing only unidirectional fluid flow into and out of said compression volume; and wherein as said actuator moves said spool between positions within said housing, said spool varying the volume of said compression volume to create positive pressure, thereby creating a pumping action.

14. The brake force control valve of claim 13, wherein said actuator comprises a coil coupled to said housing, and a ferrous core magnetically interacting with said coil.

15. The brake force control valve of claim 13, further including a spring acting between said spool and said housing to urge said spool to a first position, wherein said coil is energized to move said spool from said first position against said spring to move said spool to a second position.

16. The brake force control valve of claim 13, wherein said spool at said first position causes the brake force control valve to function as an open valve and wherein said spool at said second position causes the brake force control valve to function as a closed valve.

17. The brake force control valve of claim 13, wherein said fluid channels provide connections to external brake components.

18. The brake force control valve of claim 13, further comprising a filter coupled to at least one said fluid channel.

* * * * *